US012674654B2

(12) United States Patent
Peterson et al.

(10) Patent No.: US 12,674,654 B2
(45) Date of Patent: Jul. 7, 2026

(54) AGRICULTURAL BALER WITH FLAKE PREDICTION FOR BALE LENGTH CONTROL

(71) Applicant: CNH Industrial America LLC, New Holland, PA (US)

(72) Inventors: Charles B. Peterson, West Grove, PA (US); Rory G. Chisholm, Denver, PA (US); Derek J. Friesen, Crystal City (CA); Sean D. Chevalier, Clearwater (CA)

(73) Assignee: CNH Industrial America LLC, New Holland, PA (US)

( * ) Notice: Subject to any disclaimer, the term of this patent is extended or adjusted under 35 U.S.C. 154(b) by 469 days.

(21) Appl. No.: 18/205,111

(22) Filed: Jun. 2, 2023

(65) Prior Publication Data

US 2023/0392917 A1     Dec. 7, 2023

Related U.S. Application Data

(60) Provisional application No. 63/349,812, filed on Jun. 7, 2022.

(51) Int. Cl.
*A01F 15/00*        (2006.01)
*A01F 15/04*        (2006.01)
(Continued)

(52) U.S. Cl.
CPC ............ *G01B 5/043* (2013.01); *A01F 15/046* (2013.01); *A01F 15/145* (2013.01); *A01F 15/042* (2013.01)

(58) Field of Classification Search
CPC ...... G01B 5/043; A01F 15/046; A01F 15/042; A01F 15/145
See application file for complete search history.

(56) References Cited

U.S. PATENT DOCUMENTS

| | | | |
|---|---|---|---|
| 7,707,932 B1 | 5/2010 | Hoover et al. | |
| 10,542,679 B2 | 1/2020 | Younk et al. | |
| (Continued) | | | |

FOREIGN PATENT DOCUMENTS

| | | | |
|---|---|---|---|
| AU | 2021205022 A1 | 8/2021 | |
| EP | 3818815 A1 | 5/2021 | |
| EP | 3834603 A1 * | 6/2021 | ............. G01S 13/88 |

OTHER PUBLICATIONS

Extended European Search Report and Written Report for EP Application No. 23178085.9 dated Nov. 6, 2023 (eight pages).

*Primary Examiner* — Claude J Brown

(74) *Attorney, Agent, or Firm* — Buchanan Ingersoll & Rooney PC

(57)        ABSTRACT

An agricultural baler includes a main bale chamber in which crop material is compressed into bales. The main bale chamber includes an inlet for receiving a wad of crop material from a pre-compression chamber of the agricultural baler, and an outlet for discharge of compressed crop material into a bale. The bale includes a plurality of flakes that are incrementally added to form the bale. A bale length sensor is configured to determine a current length of the bale as the bale is being formed in the main bale chamber. A controller is configured to estimate a completed length of the bale during formation of the bale based on (i) the current length of the bale being formed and (ii) a predicted thickness of an impending flake to be added to the bale.

21 Claims, 2 Drawing Sheets

Figure 1:
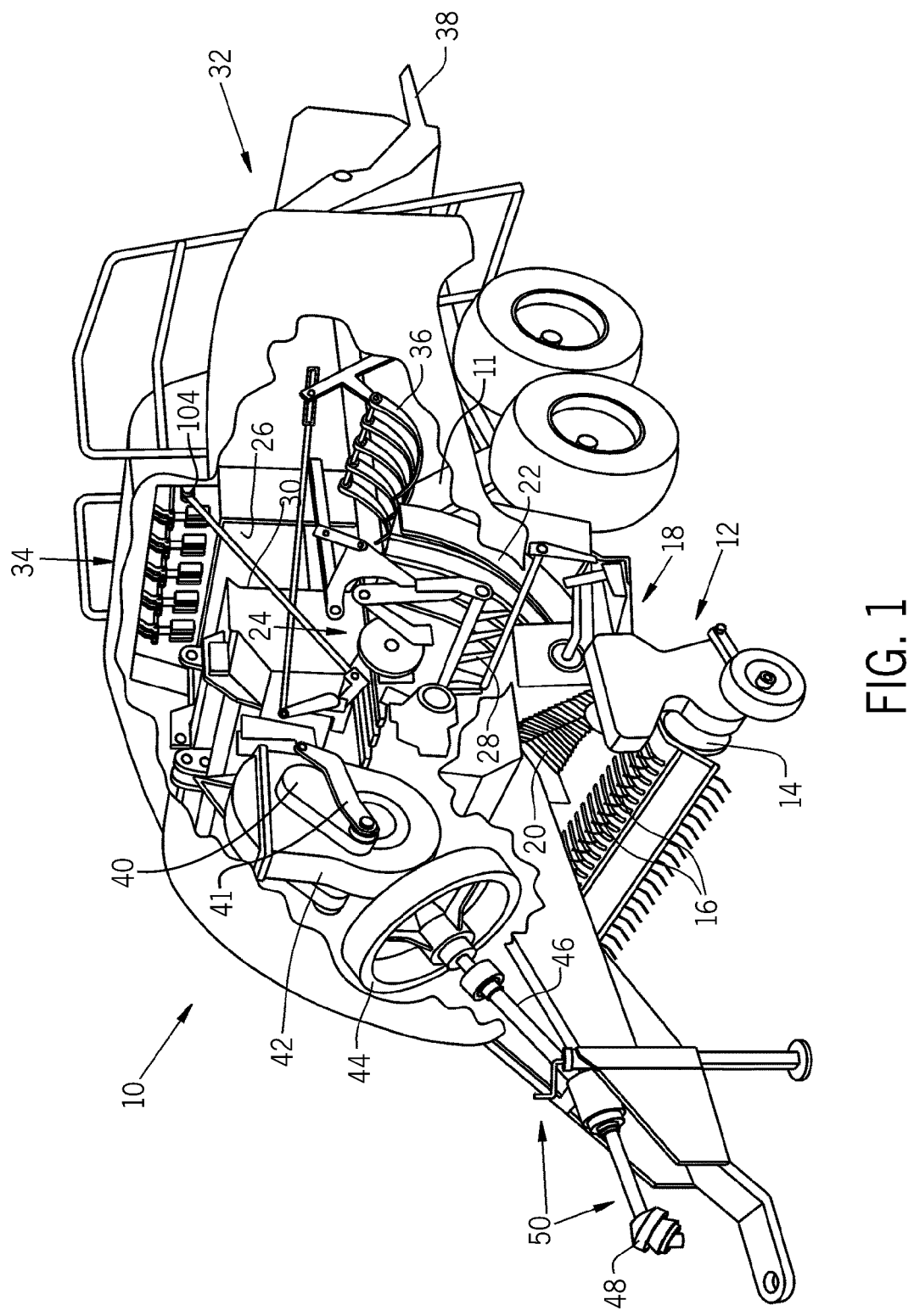

(51) Int. Cl.
  *A01F 15/14*        (2006.01)
  *G01B 5/04*        (2006.01)

(56)             References Cited

U.S. PATENT DOCUMENTS

| 2013/0112092 | A1* | 5/2013 | Vanhoutte ........... A01F 15/0858 |
| | | | 100/19 R |
| 2016/0088798 | A1* | 3/2016 | Lang ...................... B30B 9/301 |
| | | | 56/341 |
| 2016/0088800 | A1* | 3/2016 | Lang .................... B30B 9/3078 |
| | | | 56/10.2 R |
| 2016/0290798 | A1* | 10/2016 | Verhaeghe .......... A01F 15/0825 |
| 2018/0125011 | A1 | 5/2018 | Biziorek et al. |
| 2018/0228091 | A1 | 8/2018 | Demon |
| 2020/0215918 | A1* | 7/2020 | Olander ............. A01F 15/0825 |
| 2021/0055158 | A1* | 2/2021 | Hunt ........................ G01P 3/00 |

* cited by examiner

AGRICULTURAL BALER WITH FLAKE PREDICTION FOR BALE LENGTH CONTROL

CROSS-REFERENCE TO RELATED APPLICATION

This application claims priority to U.S. Provisional Patent Application No. 63/349,812, filed Jun. 7, 2022, the content of such application being incorporated by reference herein in its entirety.

FIELD OF THE INVENTION

The present invention pertains to an agricultural baler and, more specifically, to a square baler.

BACKGROUND OF THE INVENTION

As is described in U.S. Patent App. Pub. No. 2018/0228091 and European Patent No. 3818815, which are each incorporated by reference herein in their entirety, agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber, which is then transferred to a main bale chamber. (For purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit, which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. The plunger reciprocates, back and forth, toward and away from the discharge end of the baler. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

The knotter cycle, which must be completed to tie twine around the bale and define the length of the bale, occurs between two flakes being added to the bale. In known balers, especially small square balers, the thickness of the flakes being added to the bale may vary considerably. If the thickness of the incoming flake is unknown, the future length of the bale after adding the flake cannot be reasonably ascertained. This uncertainty is significant when the forming bale is relatively close to the defined length before the knotters activate to tie up the bale. Described herein is a method and apparatus for approximating the thickness of the incoming flake.

SUMMARY OF THE INVENTION

According to one aspect of the invention, an agricultural baler includes a main bale chamber in which crop material is compressed into bales. The main bale chamber includes an inlet for receiving a wad of crop material from a pre-compression chamber of the agricultural baler, and an outlet for discharge of compressed crop material into a bale. The bale includes a plurality of flakes that are incrementally added to form the bale. A bale length sensor is configured to determine a current length of the bale as the bale is being formed in the main bale chamber. A controller is configured to estimate a completed length of the bale during formation of the bale based on (i) the current length of the bale being formed and (ii) a predicted thickness of an impending flake to be added to the bale.

BRIEF DESCRIPTION OF THE DRAWING FIGURES

Figure 2:
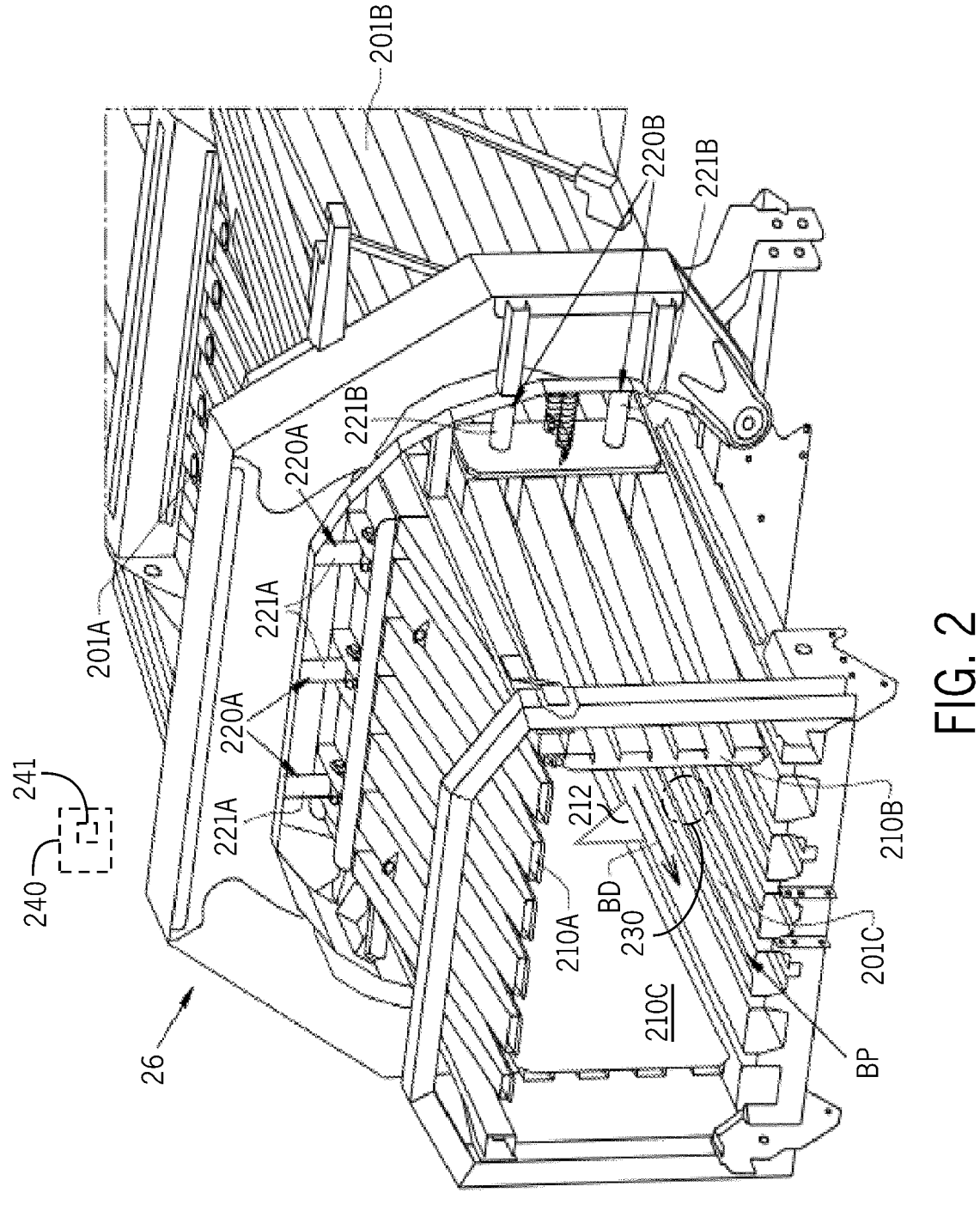

FIG. 1 is a perspective cutaway view showing the internal workings of a large square baler, which includes a bale ejection system of the present invention; and FIG. 2 is a perspective rear view of a baling chamber of the baler of FIG. 1.

DESCRIPTION OF THE INVENTION

Referring to the drawings, and more particularly to FIG. 1, there is shown a perspective cutaway view showing the internal workings of a large square baler 10 including a chassis 11. The baler 10 operates on a two-stage feeding system. Crop material is lifted from windrows into the baler 10 using a pickup unit 12. The pickup unit 12 includes a rotating pickup roll 14 with tines 16 which move the crop rearward toward a packer unit 18 and/or a rotor unit. An optional pair of stub augers (one of which is shown, but not numbered) are positioned above the pickup roll 14 to move the crop material laterally inward. The packer unit 18 includes packer tines 20, which push the crop into a pre-compression chamber 22 to form a wad of crop material. The packer tines 20 intertwine the crop together and pack the crop within the pre-compression chamber 22. The pre-compression chamber 22 and the packer tines 20 function as the first stage for crop compression. Once the pressure in the pre-compression chamber 22 reaches a predetermined sensed value, a stuffer unit 24 moves the wad of crop from the pre-compression chamber 22 to a bale chamber 26, which is carried by the chassis 11 and may also be referred to as a "main bale chamber." The stuffer unit 24 includes stuffer forks 28 which thrust the wad of crop directly in front of a plunger 30, which reciprocates within the main bale chamber 26 and compresses the wad of crop into a flake. The stuffer forks 28 return to their original stationary state after the wad of material has been moved into the main bale chamber 26. The plunger 30 compresses the wads of crop into flakes to form a bale and, at the same time, gradually advances the bale from an inlet end 104 of the main bale chamber 26 toward an outlet 32 of the main bale chamber 26. The main bale chamber 26 and the plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut, and the formed bale is ejected from a discharge chute 38 as a new bale is formed.

The plunger 30 is connected via one or two crank arms 40 (only one crank arm is shown in FIG. 1) with a gear box 42. The gear box 42 is driven by a flywheel 44, which in turn is connected via a drive shaft 46 with the power take-off (PTO) coupler 48. The PTO coupler 48 is detachably connected with the PTO spline at the rear of the traction unit, such as a tractor (not shown). The PTO coupler 48, the drive shaft 46 and the flywheel 44 together define a portion of a driveline 50, which provides rotative power to the gearbox 42. The flywheel 44 has a sufficient mass to carry the plunger 30 through a compression stroke as power is applied to the drive shaft 46 by the traction unit (not shown). The number of strokes performed by the plunger per minute is dependent on the PTO speed. In one example, the PTO coupler 48 rotates at a speed of around 1000 rpm such that the plunger 30 completes around 48 strokes per minute.

A conrod 41 connecting the crank arm 40 to the gear box 42 may be equipped with load sensors, particularly load cells that enable determination of a load force experienced by the plunger during the baling process. The load cells may, for example, be provided within the conrod bearings. Alternatively, load sensors may be provided at any other point suitable for detecting the load acting on the plunger during the various phases of the stroke. The load force is typically highest when the plunger 30 engages with the crop in the bale chamber 26.

Referring now to FIG. 2, a perspective view of the bale chamber 26 is illustrated. The bale chamber 26 generally includes a plurality of stationary walls, which may include a top wall 201A, a pair of opposed side walls 201B, and a stationary bottom wall 201C opposite the top wall 201A. As the bale flows through the bale chamber 26 in a bale forming direction, which is designated by arrow BD, the bale encounters movable density doors 210A, 210B, 210C. In some embodiments, the movable density door 210A is a top density door that is pivotably coupled to a stationary part of the baling chamber 26 so as to form the top wall 201A and the movable density doors 210B and 210C are a pair of side density doors that are each pivotably coupled to a stationary part of the baling chamber 26 so as to form respective side walls 201B. A bale pressing area BP is defined between the density doors 210A, 210B, 210C and the stationary bottom wall 201C where the density doors 210A, 210B, 210C exert a pressure on a bale. The pressure exerted on the bale by the density doors 210A, 210B, 210C holds the bale in place as the plunger 30 compresses the wads of crop into flakes. A greater pressure exerted on the bale by the density doors 210A, 210B, 210C, therefore, results in a more densely packed bale that exits the bale chamber 26.

To adjust the size of the bale pressing area BP, and thus the pressure exerted on the bale by the density doors 210A, 210B, 210C, at least one actuator, e.g. at least one fluid cylinder 220A, 220B, is provided to move the density doors 210A, 210B, 210C. In the illustrated embodiment, the top density door 210A is moved by three fluid cylinders 220A and each of the side density doors 210B, 210C is moved by two fluid cylinders 220B. Each of the fluid cylinders 220A, 220B includes a cylinder rod 221A, 221B that is configured to move one of the density doors 210A, 210B, 210C, as will be described further herein. In some embodiments, the fluid cylinders 220A, 220B are hydraulically powered cylinders supplied with, for example, pressurized oil to extend and retract the cylinder rods 221A, 221B. It should be appreciated that the fluid cylinders 220A, 220B may be powered by fluids other than oil, such as other incompressible fluids, in accordance with the present disclosure.

When the fluid cylinders 220A, 220B are extended, the respective density doors 210A, 210B, 210C are pivoted towards each other to reduce the size of the bale pressing area BP. This movement of the density doors towards each other may also be referred to as "closing" the density doors. When the fluid cylinders 220A, 220B are retracted, the respective density doors 210A, 210B, 210C are pivoted away from each other to increase the size of the bale pressing area BP. This movement of the density doors away from each other may also be referred to as "opening" the density doors.

A bale length sensor is provided in the bale chamber 26 to continuously or intermittently determine the length of the bale being formed in the bale chamber 26. The bale length sensor is a star wheel 212, extending through the bottom wall 201C of the bale chamber 26. It should be appreciated that while the star wheel 212 is illustrated as extending through the bottom wall 201C of the bale chamber 26, the star wheel 212 may extend through any of the walls 201A, 201B, 201C. Only a single sprocket of the star wheel 212 is shown in the bale chamber 26 of FIG. 2. As the bale is pushed through the bale chamber 26, the bale engages the sprockets of the star wheel 212 and thus moves the sprockets of the star wheel 212 in the baling direction BD. Movement of the sprockets causes a rotation of the star wheel 212 that is directly proportional to an extension (e.g. the length) of the bale within the baling chamber.

The knotter cycle, which must be completed to tie twine around the bale and define the length of the bale, occurs between two flakes being added to the bale. In known balers, especially small square balers, the thickness of the flakes being added to the bale may vary considerably. If the thickness of the incoming flake is unknown, the future length of the bale after adding the flake cannot be reasonably ascertained. This uncertainty is significant when the forming bale is relatively close to the defined length before the knotters activate to tie up the bale.

To address some of the previously described issues, and referring still to FIGS. 1-2, an encoder 230 is either associated with or forms part of the bale length sensor and is operably coupled to a controller 240, which is also operably coupled to the knotters 34 to control operation of the knotters 34. The encoder 230 outputs rotation signals corresponding to a rotation distance of the star wheel 212. The rotation signals may correspond to degrees of rotation of the star wheel 212, with the degrees of rotation directly correlated to the change in length of the forming bale e.g., 5° of rotation corresponds to a smaller rotation of the star wheel 212 and thus a smaller increase in length of the forming bale compared to 10° of rotation of the star wheel 212. The controller 240 is configured to receive the rotation signals and determine a thickness of a plurality of flakes of crop material added to the forming bale based on the received rotation signals. The controller 240 is further configured to predict a probable flake thickness based on determined thicknesses of previous flakes of crop material. Once the probable flake thickness is predicted, the controller 240 may, for example, determine a current length of the forming bale, determine a probable length of the forming bale when the probable flake thickness is added to the forming bale, and output a knotter cycle initiation signal so the knotters tie the forming bale if the probable length of the forming bale exceeds a defined cutoff value. In this respect, the controller 240 can predict the probable thickness of a further flake, which will be added to the length of the bale, and determine if adding the further flake to the forming bale is likely to cause the bale to be larger than intended and thus cause the knotters 34 to tie the bale.

To predict the probable flake thickness, the controller 240 can utilize the received rotation signals and determine the thickness of each flake of crop material added to one or more bales. The flakes of crop material are added to the bale incrementally. The star wheel 212 will rotate as each individual flake is added and there will likely be a momentary pause in rotation of the star wheel 212 between each flake being added. The controller 240 may be configured to determine a thickness of each flake being added to the bale by assuming that the star wheel 212 not rotating for a defined time period corresponds to the time period where a flake is not being added to the bale. The controller 240 can thus determine the thickness of each flake added to the bale by determining the rotation of the star wheel 212 in each time period where the star wheel 212 is rotating. In some embodiments, the controller 240 is configured to filter out certain events, e.g., rotation of the star wheel 212 when the baler is traveling through headlands, in determining the thickness of each flake added to the bale.

To predict a probable flake thickness based on determined thicknesses of previous flakes of crop material, the controller 240 may be configured, for example, to store previously determined thicknesses of previous flakes of crop material in a memory 241 and utilize statistical analysis of the previously determined thicknesses to predict the probable flake thickness. Statistical analysis may be tailored to provide a desired confidence interval. The controller 240 may be configured, for example, to predict the probable flake thickness based on the measured thicknesses of previous flakes and determining a mean thickness of previous flakes. In some embodiments, the controller 240 may be further configured to determine a standard deviation of the thicknesses of previous flakes and add or subtract an integer number of standard deviations to the mean thickness of previous flakes to determine a maximum (or minimum) probable flake thickness. In some embodiments, the controller 240 is configured to determine the mean thickness of previous flakes, determine the standard deviation of the thicknesses of previous flakes, and add (or subtract) two or three standard deviations of the thicknesses of previous flakes to determine the maximum (or minimum) probable flake thickness. It should be appreciated that while the controller 240 may be configured to predict the probable thickness as the mean thickness of previous flakes, the controller 240 can be configured in many different ways to predict the probable thickness.

After the controller 240 predicts the probable thickness, the controller 240 can determine whether the knotters 34 should tie the bale or not. For example, if the forming bale is at 99% of the defined bale length and the controller 240 predicts that the probable thickness is 5% of the defined bale length, which is likely to result in a bale being formed that is too large (104% of the defined bale length), the controller 240 may output the knotter cycle initiation signal to initiate the knotter cycle so the knotters 34 tie the bale. The controller 240 may be configured to output the knotter cycle initiation signal if the probable length of the forming bale when the probable flake thickness is added to the forming bale deviates from a defined bale length by more than a defined deviation amount. The defined deviation amount may be adjustable by a user so the tied bales are likely to conform to the user's desired bale length. The controller 240 may also be configured to output the knotter cycle initiation signal if a maximum probable length of the forming bale, which is equal to the maximum probable flake thickness added to the current bale length, exceeds the defined bale length. The controller 240 may also be configured with bale length protection by being configured to not output the knotter cycle initiation signal if a minimum probable length of the forming bale, which is equal to the minimum probable flake thickness added to the current bale length, is below a defined minimum length value.

The present invention also provides a method for forming bales. The method includes adding a plurality of flakes to one or more bales, determining a thickness of each of the flakes added to the one or more bales, and predicting a probable flake thickness based on the determined thickness of each of the flakes added to the one or more bales. The probable flake thickness may be used to determine if a knotter cycle should be initiated prior to adding another flake of crop material to a bale forming in a bale chamber.

It should be appreciated that while the baler 10 is illustrated and described as being what is commonly referred to as a "large square baler," the present invention also provides a small square baler that includes knotters and a bale length sensor (such as a star wheel) extending into a bale chamber along with the previously described controller 240 and the encoder 230. An exemplary small square baler is described in U.S. Pat. No. 7,707,932, which is incorporated in its entirety herein by reference.

From the foregoing, it should be appreciated that the baler provided according to the present invention has a controller that can predict the probable thickness of flakes of crop material, which allows the controller to also predict the probable length of the forming bale after another flake is added to the bale. Based off this prediction, the controller can determine if the knotter cycle should initiate prior to the normal setpoint, which would be activated by the bale reaching a defined length as measured by the bale length sensor.

It is to be understood that the above-described operating steps are performed by the controller 240 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 240 described herein, such as the aforementioned method of operation, is implemented in software code or instructions which are tangibly stored on the tangible computer readable medium. Upon loading and executing such software code or instructions by the controller 240, the controller 240 may perform any of the functionality of the controller 240 described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed:

1. An agricultural baler comprising:
a main bale chamber in which crop material is compressed into bales, the main bale chamber comprising an inlet for receiving a wad of crop material from a pre-compression chamber of the agricultural baler, and an outlet for discharge of compressed crop material into a completed bale formed by a plurality of flakes that are incrementally added together;
a bale length sensor that is configured to determine a current length of one bale as the bale is being formed in the main bale chamber; and
a controller that estimates a completed length of the bale during formation of the bale based on (i) the current length of the bale being formed and (ii) a predicted thickness of an impending flake to be added to the bale that is based on a thickness of the immediately preceding flake, as measured by the bale length sensor.

2. The agricultural baler of claim 1, wherein the bale length sensor is a rotatable star-wheel that is mounted in the main bale chamber.

3. The agricultural baler of claim 2, further comprising a rotary encoder that is operatively coupled to the star-wheel, the rotary encoder being configured to output rotation signals to the controller, the rotation signals corresponding to a rotation of the star-wheel.

4. The agricultural baler of claim 3, wherein the controller is configured to calculate the current length of the bale as a function of the rotation signals of the rotary encoder.

5. The agricultural baler of claim 1, further comprising a knotter that is configured to wrap and tie twine around a formed bale in the main bale chamber.

6. The agricultural baler of claim 5, wherein the controller is configured to activate the knotter to wrap and tie twine around the formed bale in the main bale chamber once the controller calculates that the completed length estimate is within a pre-determined range.

7. The agricultural baler of claim 1, wherein the controller is configured to calculate the predicted thickness based on a mean thickness of multiple preceding flakes, as measured by the bale length sensor.

8. The agricultural baler of claim 1, wherein the controller is configured to calculate the predicted thickness based on a mean thickness of multiple preceding flakes, as measured by the bale length sensor, and the controller is further configured to calculate a standard deviation of the thicknesses of the multiple preceding flakes.

9. The agricultural baler of claim 8, wherein the controller is configured to either add or subtract the standard deviation to the mean thickness to determine the predicted thickness of the impending flake as either a maximum or minimum value, respectively.

10. The agricultural baler of claim 8, wherein the controller is configured to calculate either two or three standard deviations of the thicknesses of the multiple preceding flakes, and either add or subtract the two or three standard deviations to the mean thickness to determine the predicted thickness of the impending flake as either a maximum or minimum value, respectively.

11. The agricultural baler of claim 8, wherein the controller comprises a memory for storing the current length and a measured thickness of each of the multiple preceding flakes.

12. The agricultural baler of claim 1, wherein in calculating the predicted thickness, the controller is configured to filter out signals transmitted by the bale length sensor during events including headland travel.

13. The agricultural baler of claim 1, further comprising a plunger that is configured for compressing the crop material within the main bale chamber.

14. An agricultural vehicle comprising a tractor and the agricultural baler of claim 1 mounted to the tractor.

15. A method of operating an agricultural baler, the method comprising:
compressing crop material in a main bale chamber of the agricultural baler to form bales, the main bale chamber comprising an inlet for receiving a wad of crop material from a pre-compression chamber of the agricultural baler, and an outlet for discharge of compressed crop material into a completed bale formed by a plurality of flakes that are incrementally added together;
determining a current length of one bale as the bale is being formed in the main bale chamber using a bale length sensor of the agricultural baler; and
estimating a completed length of the bale during formation of the bale using a controller of the agricultural baler based on (i) the current length of the bale being formed and (ii) a predicted thickness of an impending flake to be added to the bale that is based on a thickness of the immediately preceding flake, as measured by the bale length sensor.

16. The method of claim 15, wherein the controller calculates the predicted thickness based on a mean thickness of multiple preceding flakes, as measured by the bale length sensor.

17. The method of claim 15, wherein the controller calculates the predicted thickness based on a mean thickness of multiple preceding flakes, as measured by the bale length sensor, and the controller further calculates a standard deviation of the thicknesses of the multiple preceding flakes.

18. The method of claim 17, wherein the controller either adds or subtracts the standard deviation to the mean thickness to determine the predicted thickness of the impending flake as either a maximum or minimum value, respectively.

19. The method of claim 17, wherein the controller calculates either two or three standard deviations of the thicknesses of the multiple preceding flakes, and either adds or subtracts the two or three standard deviations to the mean thickness to determine the predicted thickness of the impending flake as either a maximum or minimum value, respectively.

20. The method of claim 17, further comprising storing the current length and a measured thickness of each of the multiple preceding flakes in a memory of the controller.

21. The method of claim 15, wherein in calculating the predicted thickness, the controller filters out signals transmitted by the bale length sensor during events including headland travel.

* * * * *